(12) United States Patent
Gulati et al.

(10) Patent No.: US 9,298,512 B2
(45) Date of Patent: Mar. 29, 2016

(54) CLIENT PLACEMENT IN A COMPUTER NETWORK SYSTEM USING DYNAMIC WEIGHT ASSIGNMENTS ON RESOURCE UTILIZATION METRICS

(75) Inventors: Ajay Gulati, Palo Alto, CA (US); Ganesha Shanmuganathan, Santa Clara, CA (US); Peter Joseph Varman, Houston, TX (US); Pradeep Padala, Sunnyvale, CA (US); Mukil Kesavan, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 427 days.

(21) Appl. No.: 13/594,808

(22) Filed: Aug. 25, 2012

(65) Prior Publication Data

US 2014/0059207 A1 Feb. 27, 2014

(51) Int. Cl.
*G06F 15/16* (2006.01)
*G06F 9/50* (2006.01)

(52) U.S. Cl.
CPC .............. *G06F 9/505* (2013.01); *G06F 9/5077* (2013.01)

(58) Field of Classification Search
CPC ............................................ G06F 2009/4557
USPC ........................................................ 709/224
See application file for complete search history.

(56) References Cited

U.S. PATENT DOCUMENTS

| | | | |
|---|---|---|---|
| 7,447,769 B2 | 11/2008 | Gonsalves et al. | |
| 8,103,486 B1 * | 1/2012 | Rolia et al. | 703/2 |
| 8,732,291 B2 * | 5/2014 | Zhu et al. | 709/223 |
| 2004/0243699 A1 | 12/2004 | Koclanes et al. | |
| 2009/0300606 A1 * | 12/2009 | Miller et al. | 718/1 |
| 2010/0030877 A1 * | 2/2010 | Yanagisawa | 709/221 |
| 2010/0083248 A1 * | 4/2010 | Wood et al. | 718/1 |
| 2011/0131570 A1 * | 6/2011 | Heim | 718/1 |
| 2011/0131571 A1 * | 6/2011 | Heim | G06F 9/45558 718/1 |
| 2011/0202640 A1 * | 8/2011 | Pillutla | 709/221 |
| 2011/0213911 A1 * | 9/2011 | Eidus | G06F 9/00 711/6 |
| 2011/0239215 A1 * | 9/2011 | Sugai | 718/1 |
| 2012/0089980 A1 | 4/2012 | Sharp et al. | |
| 2012/0102185 A1 | 4/2012 | Fernandes | |
| 2012/0131573 A1 * | 5/2012 | Dasari et al. | 718/1 |
| 2012/0290630 A1 * | 11/2012 | Aizman et al. | 707/827 |
| 2012/0297382 A1 * | 11/2012 | Kim et al. | 718/1 |
| 2012/0324071 A1 * | 12/2012 | Gulati et al. | 709/223 |
| 2013/0031559 A1 * | 1/2013 | Alicherry | G06F 9/5077 718/104 |
| 2013/0111034 A1 * | 5/2013 | Upadhya | 709/226 |
| 2013/0111468 A1 * | 5/2013 | Davis et al. | 718/1 |
| 2013/0145364 A1 * | 6/2013 | Yang et al. | 718/1 |
| 2013/0227559 A1 * | 8/2013 | Tsirkin | 718/1 |

(Continued)

FOREIGN PATENT DOCUMENTS

WO 2012-069064 A1 5/2012

OTHER PUBLICATIONS

VMware Technical Journal, vol. 1, No. 1—Apr. 2012, Editors: Steve Muir, Rita Tavilla and Ben Verghese.*

(Continued)

*Primary Examiner* — Hamza Algibhah (57) ABSTRACT

A system and method for placing a client in a computer network system uses continuously variable weights to resource utilization metrics for each candidate device, e.g., a host computer. The weighted resource utilization metrics are used to compute selection scores for various candidate devices to select a target candidate device for placement of the client.

30 Claims, 5 Drawing Sheets

(56) References Cited

U.S. PATENT DOCUMENTS

| | | | |
|---|---|---|---|
| 2013/0247034 A1* | 9/2013 | Messerli | 718/1 |
| 2013/0297964 A1* | 11/2013 | Hegdal et al. | 714/2 |
| 2014/0019624 A1* | 1/2014 | Kusuta et al. | 709/226 |

OTHER PUBLICATIONS

International Search Report and Written Opinion, PCT/US2013/056522, Dec. 11, 2013.
A. Ghodsi et al., "Dominant Resource Fairness: Fair Allocation of Multiple Resource Types," NSDI'11, 2011.
A. Gulati et al., "PARDA: Proportional Allocation of Resources for Distributed Storage Access," FAST'09, 2009.
W.Leinberger et al., "Multi-Capacity Bin Packing Algorithms with Applications to Job Scheduling under Multiple Constraints"; ICPP'99, 1999.
V. Pai et al, "Locality-Aware Request Distribution in Cluster-Based Network Servers," ASPLOS-VIII, 1998.
B. Sotamayor et al., "Virtual Infrastructure Management in Private and Hybrid Clouds," IEEE Internet Computing, 2009.
J. M. Tirado et al., "Predictive Data Grouping and Placement for Cloud-Based Elastic Server Infrastructures"; CCGrid, Dec. 2009.
D. Wilcox et al., "Probabilistic Virtual Machine Assignment," Cloud Computing, Nov. 2010.
Amazon EC2, http://aws.amazon.com/ec2/; accessed Apr. 16, 2013.
Microsoft Hyper-V, http://technet.microsoft.com/library/cc816638(WS.10).aspx; accessed Apr. 16, 2013.
Nimbula Director, http://nimbula.com/product; accessed Apr. 16, 2013.
"Resource Management with VMware DRS," 1998-2006, from http://www.vmware.com/pdf/vmware_drs_wp.pdf; accessed Apr. 16, 2013.
VMware vCloud Director, http://www.vmware.com/product/vcloud-director/overview.html; accessed Apr. 16, 2013.

\* cited by examiner

CLIENT PLACEMENT IN A COMPUTER NETWORK SYSTEM USING DYNAMIC WEIGHT ASSIGNMENTS ON RESOURCE UTILIZATION METRICS

BACKGROUND

Placement of resource-consuming clients, such as virtual machines (VMs), on the right supporting devices in a computer network system is an important factor in efficiently utilizing physical resources in the computer network system. An effective client placement strategy must meet the requirements of the clients and optimize several, sometimes conflicting, goals, while taking into consideration the complexities of the computer network system.

With respect to VMs, the initial placement of new VMs on hosting devices and storage devices is particularly challenging because of various parameters involved. The hosting and storage devices have multiple attributes that are pertinent to placement decisions. A hosting device has attributes, such as the amount of available CPU, memory and network bandwidth, which may be important parameters to consider for VM placement. A storage device has attributes, such as free space, current latency and available input/output per second (IOPS), which may also be important parameters to consider for VM placement. These different attributes of the hosting devices and storage devices make efficient placement decisions for VMs difficult.

SUMMARY

A system and method for placing a client in a computer network system uses continuously variable weights to resource utilization metrics for each candidate device, e.g., a host computer. The weighted resource utilization metrics are used to compute selection scores for various candidate devices to select a target candidate device for placement of the client.

A method for placing a client in a computer network system in accordance with an embodiment of the invention comprises collecting a plurality of resource utilization metrics for each candidate device from a group of candidate devices in the computer network system that can support the client, assigning continuously variable weights to the resource utilization metrics for each candidate device, computing a selection score using the resource utilization metrics with the continuously variable weights for each candidate device, and selecting a target candidate device from the group of candidate devices for placement of the client based on the selection score of the target candidate device. In some embodiments, the steps of this method are performed when program instructions contained in a computer-readable storage medium is executed by one or more processors of a computer system.

A system in accordance with an embodiment of the invention comprises a plurality of host computers, and a client placement module operably connected to the plurality of host computers. The client placement module is configured to collect a plurality of resource utilization metrics for each host computer from a group of the host computers that can support a client to be placed in the system. The client placement module comprises a dynamic weight adjusting unit configured to assign continuously variable weights to the resource utilization metrics for each host computer from the group of host computers, and a selection score computing unit configured to compute a selection score using the resource utilization metrics with the continuously variable weights for each host computer from the group of host computers. The client placement module is further configured to select a target host computer from the group of host computers for placement of the client based on the selection score of the target host computer.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
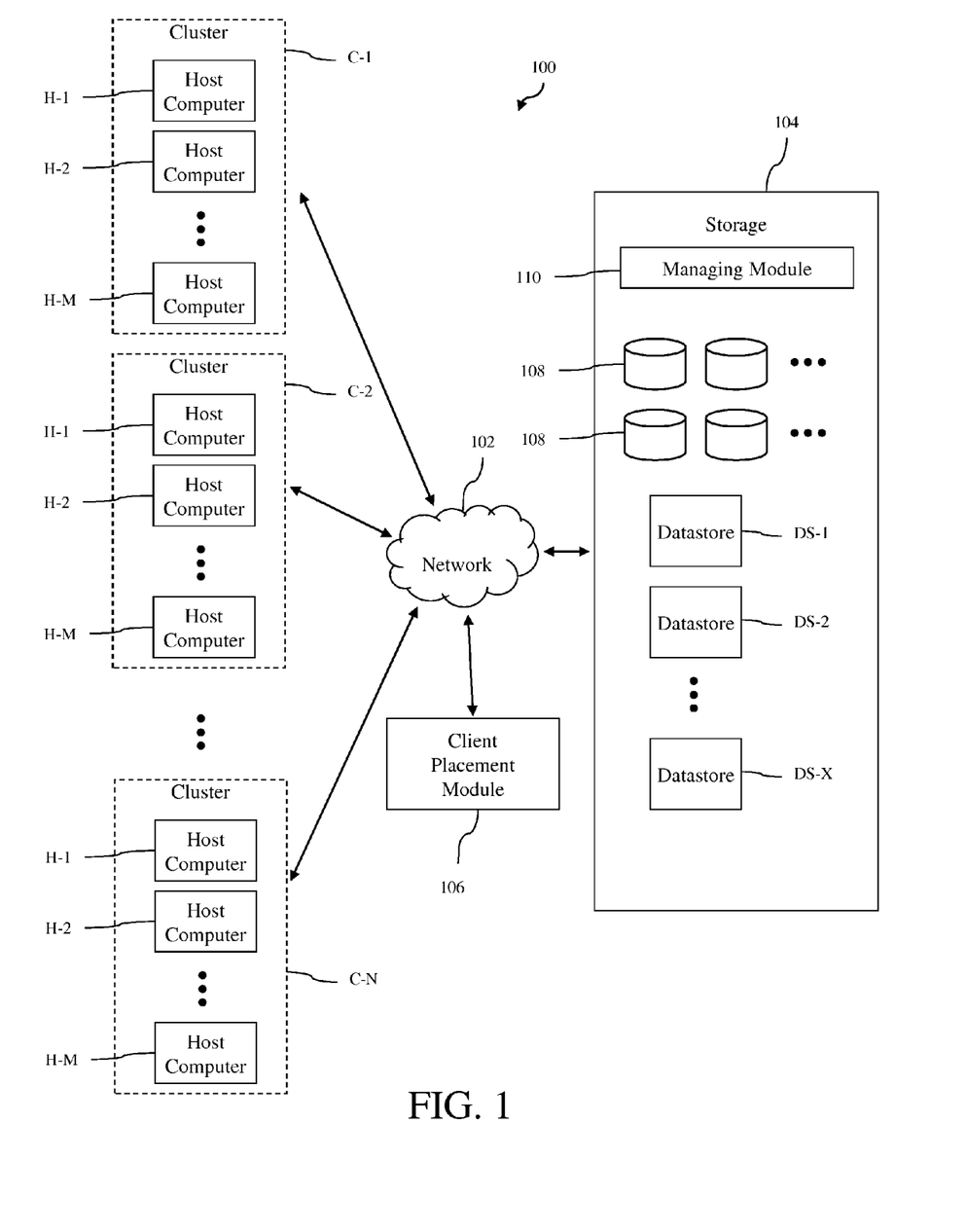
FIG. 1 is a block diagram of a computer network system in accordance with an embodiment of the invention.

Turning now to FIG. 1, a computer network system 100 in accordance with an embodiment of the invention is shown. As shown in FIG. 1, the computer network system includes a network 102, clusters C-1, C-2 . . . C-N (where N is a positive integer) of host computers, storage 104 and a client placement module 106. The exact number of host computer clusters included in the computer network system can be from few clusters to tens of clusters or more. The host computers of the different clusters, the storage and the client placement module are connected to the network. Thus, each of the host computers in the clusters is able to access the storage via the network and may share the resources provided by the storage with the other host computers. Consequently, any process running on any of the host computers may also access the storage via the network.

In the illustrated embodiment, each of the clusters C-1, C-2 . . . C-N includes a number of host computers H-1, H-2 . . . H-M (where M is a positive integer). The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 108, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 110, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters C-1, C-2 . . . C-N. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore.

The client placement module 106 operates to determine the placement of new clients in the computer network system 100 with respect to the host computers of the clusters C-1, C-2 . . . C-N and the datastores DS-1, DS-2 . . . DS-X. In an embodiment, the client placement module selects a host computer among all possible host computers that can support the client to be placed and a datastore connected to the selected host computer for client placement. In another embodiment, the client placement module first selects a cluster or group of host computers from all possible clusters or groups of host computers that can support the client to be placed and a datastore connected to the selected group of host computers for client placement. The client placement module then selects a host computer in the selected cluster for the client to be placed or allows another entity, e.g., a device, system or program, to perform the host computer selection. As described in more detail below, for each client, the client placement module calculates a client placement score for each combination of possible host computer/cluster and datastore using dynamic metric weights for one or more resources provided by the host computer/cluster and the datastore based on the current utilization of those resources. The client placement module than selects the best combination of host computer/cluster and datastore for each client to be placed on the computer network system. If a cluster-datastore combination has been selected, the client placement module then selects a host computer in the selected cluster based on a host computer selection process or allows another entity, e.g., a device, system or program, to make the host computer selection.

In some embodiments, the client placement module 106 may be implemented as software installed in any computer system, such as one of the host computers H-1, H-2 . . . H-M in any of the clusters C-1, C-2 . . . C-N or any other computer or server in the computer network system. In an embodiment, the client placement module may be implemented as software installed in a management server (not shown) in the computer network system 100 that performs management functions of the computer network system. The client placement module may be implemented in a single computer system or distributed among multiple computer systems.

Figure 2:
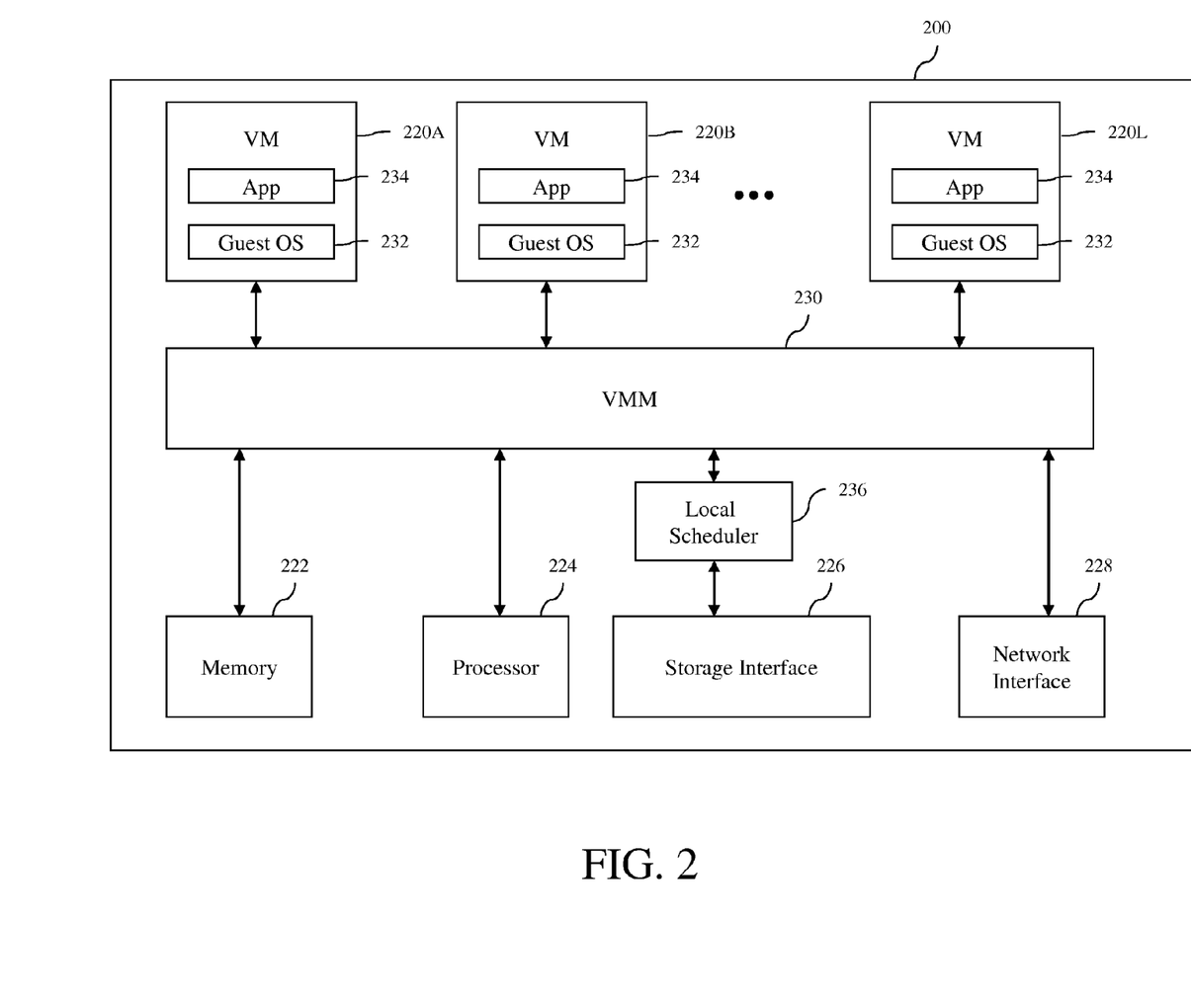
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware Distributed Resource Scheduler (DRS), to manage resource requests made by the VMs 220A, 220B . . . 220L. Although the local scheduler is illustrated in FIG. 2 as being separate from the virtual machine monitor 230, the local scheduler may be implemented as part of the virtual machine monitor. In some embodiments, the local scheduler is implemented as software programs running on the host computer. However, in other embodiments, the local scheduler may be implemented using any combination of software and hardware.

There are many challenges to make client placement decisions at cluster or host computer level efficiently. Host computers and datastores have multiple attributes that influence placement decisions. Each host computer has attributes such as the amount of available CPU, memory and network bandwidth. Clusters inherit these attributes from their host computers. Each datastore has attributes such as amount of free space, current latency and available input/output operations per second (IOPS). Thus, each pair of host computer and datastore or each pair of cluster and datastore can be represented by a multi-dimensional vector representing these attributes. As described below, the client placement module 106 may select the best pair based on a single aggregated score for client placement.

In addition, the scale of the computer network system 100 may make it infeasible to provide the client placement module 106 with statistics for individual host computers. Therefore, statistics for groups of host computers (e.g., clusters) may be aggregated and such aggregates may be exposed or provided to the client placement module, for example, by the management server (not shown) of the computer network system. Similar aggregation can be performed for datastores by combining datastores with similar profiles based on static characteristics such as redundancy, backup period etc. However, aggregation may lead to several issues. One issue is that the total (aggregated) amount of a resource available may be fragmented across several objects. For example, a cluster with 32 gigahertz (GHz) free CPU may not be able to accommodate an 8 GHz virtual machine (VM) because the 32 GHz may be distributed evenly across 32 host computers in the cluster. Another issue is that the maximum available amount of different resources may exist on different objects. For example, if the maximum CPU and memory are only available on different hosts, a VM requiring both resources may not fit on the cluster.

Moreover, different resources have different ranges and units of measurement, which may not be comparable. For example, host computer CPU and memory may range up to $10^5$ megahertz (MHz) and $10^6$ megabytes (MBs), respectively. Similarly, datastore space can be tens of terabytes (TBs), whereas datastore latency may be less than 100 milliseconds (ms). These different ranges and units of measurement make it much harder for the client placement module 106 to compare consumption across various resources.

Additionally, a datastore may not be connected all the host computers in a cluster. Some users may not even want to use one of the connected datastores for clients to be placed. Rather, the users may want to use local datastores for clients that do not require reliable storage. In these situations, host-level CPU and memory statistics can mislead the client placement module 106, if information about datastore connectivity is not provided.

Furthermore, clients belonging to the same tenant may need to be located on the same host computer or the same cluster (rack) to meet network latency and inter-client bandwidth goals. Similarly, for VMs, virtual disks for a new VM may prefer a storage device that contains a template disk for that VM, which may facilitate faster VM provisioning over copying from a remote storage device. These and other affinity rules may have other business use cases, such as providing high availability and reliability.

The client placement module 106 addresses at least some of these challenges to provide an intelligent placement of clients to underlying resources, which can help avoid many problems in terms of load balancing, effective utilization of hardware, lower stress on network bisection bandwidth, and faster deployment of clients. The client placement module is designed with the following goals in mind. The client placement module should balance various resource utilizations across clusters as well as datastores. In particular, the client placement module should balance utilization of CPU, memory and network across clusters/host computers, as well as datastores. Balanced allocation of resources allows workloads to burst without losing performance. The client placement module should also maximize the number of clients, e.g., VMs, that can be placed on the underlying infrastructure. A poor placement technique can run out of resources due to skewed connectivity or consumption. The client placement module should preferentially place clients from a single application or a tenant on the same host computer or cluster. This can lead to better L2 connectivity, lower inter-client communication latency, and reduced load on the network bi-section bandwidth. Similarly, for VMs, the client placement module should preferentially place VMs on a datastore that contain templates of virtual disks with specific installed OSs that match the requirements of a new VM to exploit linked clone, fast-provisioning and de-duplication features. The client placement module should also select datastores that are widely connected. A datastore may have different degrees of connectivity to host computers and clusters. Datastores that are widely connected are more desirable than those with limited connectivity. Higher connectivity increases flexibility for client migration during peak load. Also, all resources should be consumed equitably so that one resource does not run out while there is a surplus of other resources, which can happen if a large datastore is connected to a small cluster or vice versa. For example, consider two equally loaded datastores A and B connected to two clusters. The datastore A is connected to a single host computer in the cluster with 50% CPU utilization, while the datastore B is connected to eight host computers in a cluster with 60% CPU utilization. If connectivity degree is not considered, the datastore A would be selected for placement. However, by loading the single host computer connected to the datastore A, new VMs with affinity for the datastore A or its attached host computer will be penalized. On the other hand, if the datastore B is chosen, the load across host computers can be balanced over time to handle host-level hotspots.

Figure 3:
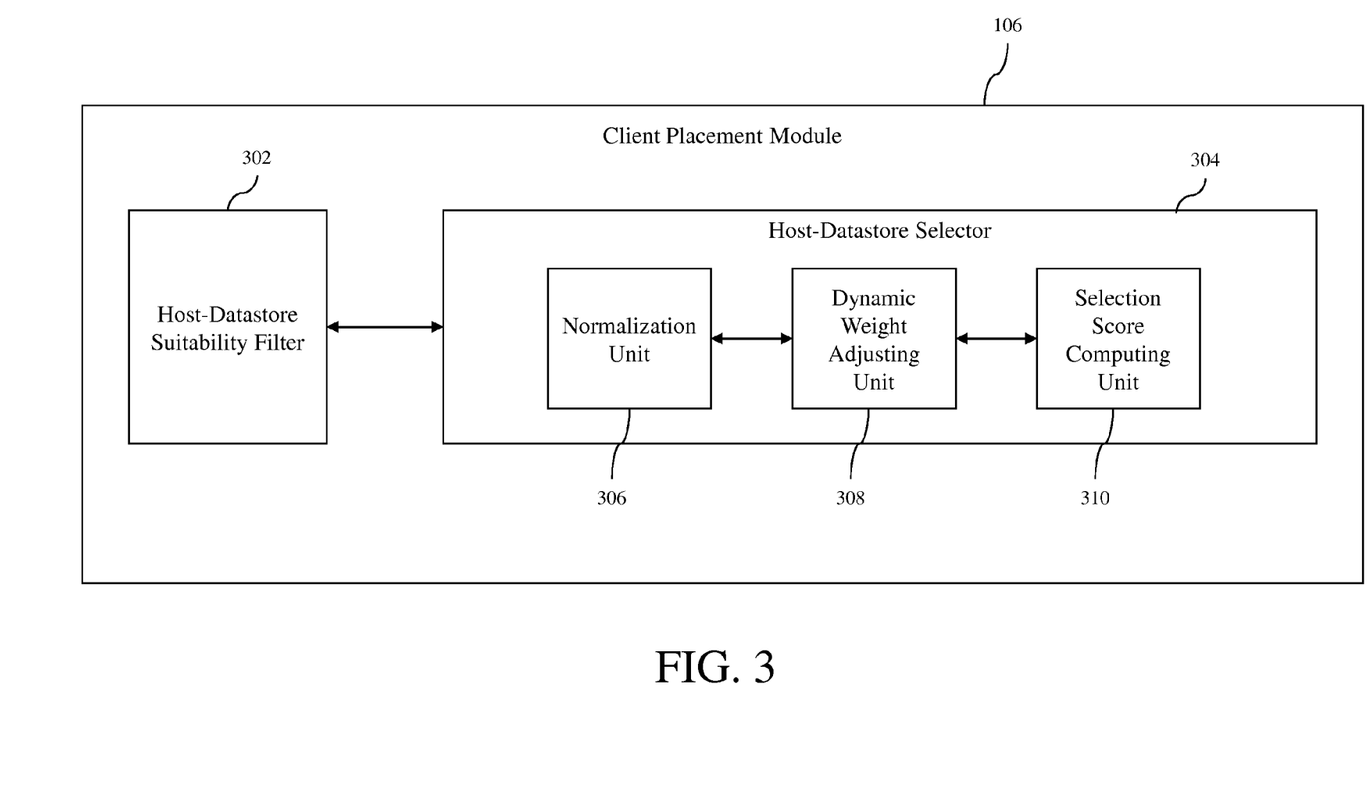
FIG. 3 is a block diagram of a client placement module included in the computer network system in accordance with an embodiment of the invention.

Turning now to FIG. 3, a block diagram of the client placement module 106 in accordance with an embodiment of the invention is shown. The client placement module is configured to select one or more target candidate devices, which can be any physical or virtual devices that can support the client to be placed, such as host computers and datastores, from a group of candidate devices that can support the client for placement. In this embodiment, the client placement module is configured to select the best pair of host computer and datastore for a client to be placed by finding all the suitable pairs of host computer and datastore that are compatible with the requirements of the client and then selecting the best pair of host computer and datastore from the suitable pairs of host computer and datastore.

As shown in FIG. 3, the client placement module 106 includes a host-datastore suitability filter 302 and a host-datastore selector 304. These components of the client placement module may be implemented as software and/or hardware. In a particular implementation, the host-datastore suitability filter 302 and the host-datastore selector 304 are part of software running on a computer system, such as a management server (not shown) for the computer network system 100.

The host-datastore suitability filter 302 operates to find all the suitable pairs of host computer and datastore in the computer network system 100 that are compatible with the requirements of a client to be placed. In order to find the suitable host computers and datastores, the host-datastore suitability filter considers static properties of all the host computers and datastores in the computer network system. As used herein, static properties define capabilities that do not change (or change only rarely) over time. Examples of static properties for a datastore include redundancy level (RAID-5, RAID-6, etc.), backup (yes or no), thin-provisioning, etc. Examples of static properties for a host computer include CPU type, availability of CD-ROM, Trusted Platform Module (TPM) chip, graphic processing unit (GPU) or some other specific hardware/software feature. Depending on the requirements of the client to be placed, the host-datastore suitability filter finds suitable pairs of host computer and datastore for the client and disregards other, unsuitable pairs of host computer and datastore for client.

The host-datastore selector 304 operates to select the best pair of host computer and datastore from the suitable pairs of host computer and datastore filtered by the host-datastore suitability filter 302. As described in more detail below, the host-datastore selector selects the best pair of host computer and datastore using a selection score based on dynamically adjusted weights for dynamic properties of the host computers and datastores.

Dynamic properties of host computers and datastores are properties that vary with time. Typically, these dynamic properties represent performance characteristics. For a datastore, dynamic properties include, for example, the amount of available space or observed IO latency. For a host computer, dynamic properties include, for example, CPU utilization, memory utilization and NIC utilization. These dynamic properties are periodically collected by the client placement module 106 as resource-usage statistics. The granularity and time period of the collected statistics can vary. The resource-usage statistics may be provided by each host computer, e.g., the VMM of each host computer, the managing module for the datastores, and/or the managing server.

As illustrated in FIG. 3, the host-datastore selector 304 includes a normalization unit 306, a dynamic weight adjusting unit 308 and a selection score computing unit 310. The normalization unit is configured to normalize the different resource-usage metrics to a range from zero to one, where one represents maximum or upper bound utilization and zero represents minimum utilization. In one implementation, the client placement module uses two metrics for a host computer, CPU utilization and memory utilization, and two metrics for a datastore, space utilization and latency utilization, which is a performance metric. If measured utilization is a percentage of the maximum utilization, then the percentage is converted to a number, where one is the maximum utilization. Thus, "20%" utilization will be normalized to the normalized value of "0.2". If measured utilization is a number or rate, then an upper bound number or rate is set to maximum utilization, i.e., 100%. The measured utilization can then be first converted to a percentage and then normalized. For example, if the upper bound latency rate for a datastore is set to 30 ms and the measured latency rate is 10 ms, the measured latency rate represents 33% of the "maximum" utilization, which would be normalized to a normalized value of "0.33". If an observed metric value exceeds the model maximum, then the model maximum can be changed to keep the ratio between the observed metric value and the model maximum to be less than one.

The selection score computing unit 310 is configured to compute a single selection score for each suitable pair of host computer and datastore. A placement target (host computer and datastore pair) can be described by a utilization vector $U_i=[u_i^1, u_i^2, \ldots u_i^m]$, where $u_i^j$ represents a normalized host computer or datastore metric and m is the number of metrics being used. The vectors are ranked based on their selection scores, and, in a particular implementation, the target with the lowest score is chosen for placement. The selection score can be represented as a weighted sum of the components of the utilization vector $U_i$: $f_i = \Sigma_{k=1}^m u_i^k \times u_i^k$. The weights $u_i^k$ are set by the dynamic weight adjusting unit 308, as described below.

The dynamic weight adjusting unit 308 is configured to dynamically set weights based on utilization and importance of the metrics for each placement target i (host computer and datastore pair). The dynamic weight adjusting unit uses continuously variable weights that are defined by one or more continuous functions. As used herein, a continuous function is a function that changes continuously as a variable of the function changes. As an example, for a continuous variable function of x, the function changes continuously as the value of x changes. In an embodiment, these weights are derived from a family of non-linear convex functions of the form $$\alpha \times \left(\frac{1}{1-x}\right)^{\beta},$$

where $\alpha$ and $\beta$ are values or numbers greater than zero and x is the utilization of a particular resource. These functions give greater importance to the dominant resource, but at low utilizations, allow other resources to also play a role in the selection. Each component or metric of the utilization vector could have a different weighting function to reflect differences in the criticality of that metric or underlying resource. Thus, two or more different continuously variable functions can be used for different resource utilization metrics for each placement target. In other words, different continuously variable functions can be used to derive weights for different resources. One benefit of using these weights is the flexibility of modeling a wide range of resource types and utilization thresholds simply by changing a few parameters in the functions.

Once the best pair of host computer and datastore is chosen based on the lowest computed selection score, the information can be passed to the management server (not shown) for automatic placement of the client or for display of the information to a user for manual placement.

Figure 4:
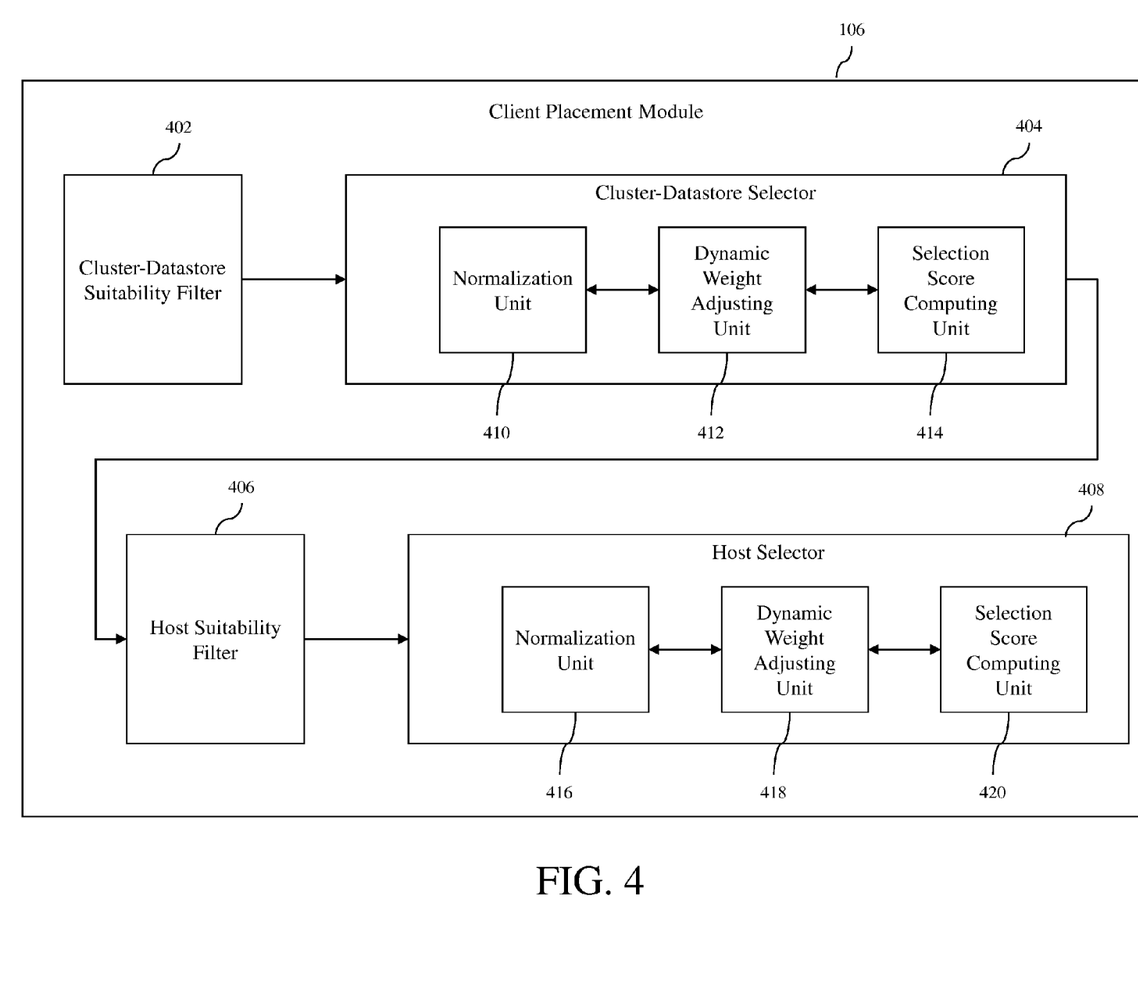
FIG. 4 is a block diagram of a client placement module included in the computer network system in accordance with another embodiment of the invention.

Turning now to FIG. 4, a block diagram of the client placement module 106 in accordance with another embodiment of the invention is shown. In this embodiment, the client placement module is configured to select the best pair of cluster of host computer and datastore for a client to be placed by finding all the suitable pairs of cluster and datastore that are compatible with the requirements of the client and then selecting the best pair of cluster and datastore from the suitable pairs of cluster and datastore. The client placement module can then find the best host computer in the selected cluster for the client placement. Alternatively, the selection of the best pair of cluster and datastore can be passed to another entity, which can be any device, system or program, using any technique so that the selection of the best host computer in the selected cluster can be performed by that entity.

As shown in FIG. 4, in this embodiment, the client placement module 106 includes a cluster-datastore suitability filter 402, a cluster-datastore selector 404, an optional host suitability filter 406 and an optional host selector 408. These components of the client placement module may be implemented as software and/or hardware. In a particular implementation, the cluster-datastore suitability filter, the cluster-datastore selector, the host suitability filter and the host selector are part of software running on a computer system, such as a management server (not shown) for the computer network system 100.

The cluster-datastore suitability filter 402 operates to find all the suitable pairs of cluster and datastore in the computer network system 100 that are compatible with the requirements of a client to be placed. In order to find the suitable cluster and datastores, the cluster-datastore suitability filter considers static properties of all the host computers and datastores in the computer network system. The filtering operation performed by the cluster-datastore suitability filter is similar to the filter operation performed by the host-datastore suitability filter 302 shown in FIG. 3 since clusters inherit the static properties of the host computers in the clusters. If a cluster that is deemed to be suitable for a client to be placed is later determined to be unsuitable for that client due to internal fragmentation of the cluster, another client placement operation can be performed with that cluster being marked as being unsuitable for the client to be placed.

The cluster-datastore selector 404 operates to select the best pair of cluster and datastore from the suitable pairs of cluster and datastore filtered by the cluster-datastore suitability filter 402. The cluster-datastore selector operates in a similar manner as the host-datastore selector 304 shown in FIG. 3 except that clusters are considered rather than individual host computers. The cluster-datastore selector selects the best pair of cluster and datastore using a selection score based on continuous variable weights for dynamic properties of the clusters and datastores.

As illustrated in FIG. 4, the cluster-datastore selector 404 includes a normalization unit 410, a dynamic weight adjusting unit 412 and a selection score computing unit 414. These units of the cluster-datastore selector operate in a similar manner as the units of the host-datastore selector 304 except that clusters are considered rather than individual host computers. The normalization unit is configured to normalize the different resource-usage metrics with respect to the suitable clusters and datastores to a range from zero to one, where one represents maximum or upper bound utilization and zero represents minimum utilization. The dynamic weight adjusting unit is configured to dynamically set weights for different metrics of clusters and datastores based on utilization and importance of the metrics for each placement target, i.e., a pair of cluster and datastore. The selection score computing unit is configured to compute a single selection score for each suitable pair of cluster and datastore.

The optional host suitability filter 406 operates to find all the suitable host computers in the selected cluster that are compatible with the requirements of the client to be placed by analyzing the static properties of the host computers. As an example, not all the host computers in the selected cluster may be connected to the selected datastore.

The optional host selector 408 operates to select the best host computer from the suitable host computers filtered by the host suitability filter. The host selector operates in a similar manner as the host-datastore selector 304 except that datastores are not considered since the best datastore has already been selected. The host selector selects the best host computer using a selection score based on continuous variable weights for dynamic properties of the suitable host computers.

As illustrated in FIG. 4, the host selector 408 includes a normalization unit 416, a dynamic weight adjusting unit 418 and a selection score computing unit 420. These units of the host selector operate in a similar manner as the units of the host-datastore selector 304 except that datastores are not considered. The normalization unit is configured to normalize the different resource-usage metrics with respect to the suitable host computers to a range from zero to one, where one represents maximum or upper bound utilization and zero represents minimum utilization. The dynamic weight adjusting unit is configured to dynamically set weights for different metrics of the suitable host computers based on utilization and importance of the metrics for each suitable host computer. The selection score computing unit is configured to compute a single selection score for each suitable host computer to select the best host computer with the lowest selection score.

In an alternative embodiment, once the best pair of cluster and datastore is found, the process of selecting the host computer in the cluster can be performed by another entity, which can be any device, system or program, using any technique so that the selection of the host computer in the selected cluster can be performed by that entity. As an example, VMware DRS in the selected cluster can choose the host computer in that cluster for placement of the client.

The client placement module 106 described herein can be further optimized using the dynamic weights. As an example, to handle soft affinity and co-placement of clients from the same tenant, lower value for the utilization metrics for such highly-affined host computers/clusters and datastores can be used as long as the current utilization is below a certain threshold. This will automatically lower the selection score for targets in which these resources appear and make them likely to be selected. As another example, to handle datastore connectivity, connectivity metrics, e.g., processor connectivity metric and memory connectivity metric, can be added to each datastore in addition to utilization metrics. As another example, to support various business policies, user or system defined tags (e.g., gold storage or TPM hosts) can be supported during placement. These tags require that the client be placed on the host computers and datastores with matching tags. The tags can be used for initial filtering of host computers/clusters and datastores.

Figure 5:
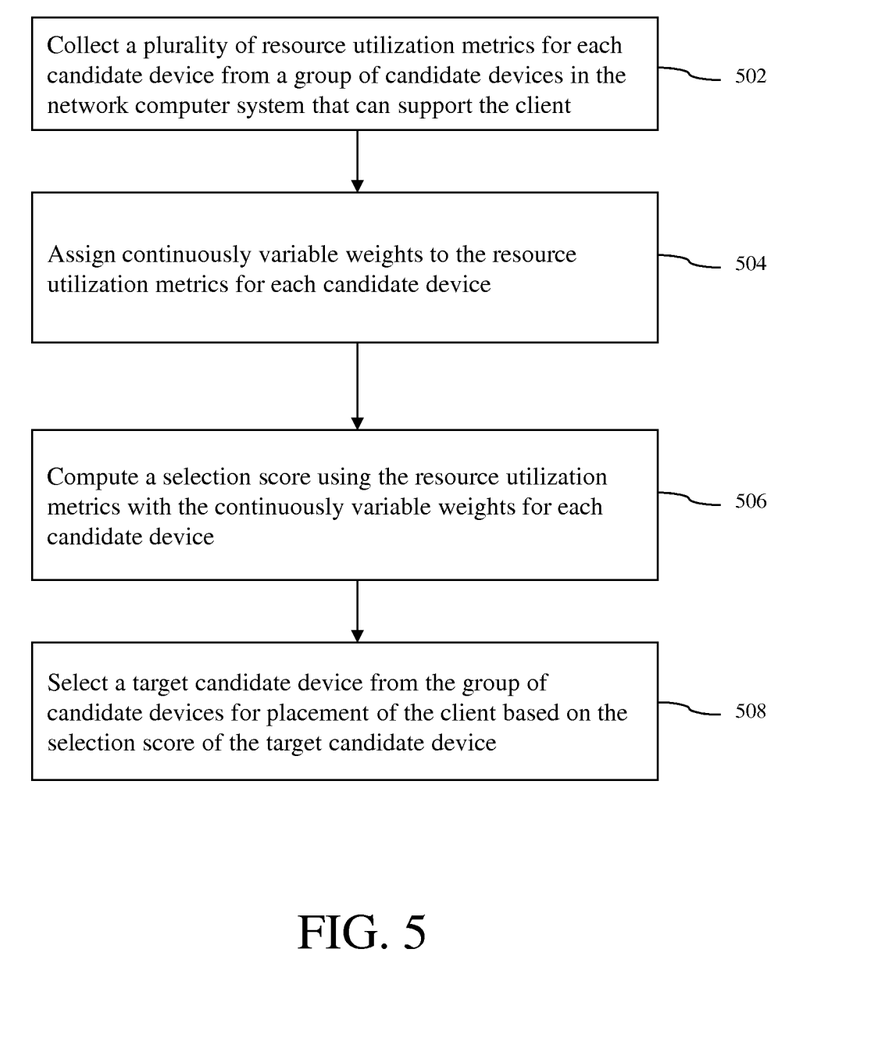
FIG. 5 is a flow diagram of a method for placing a client in a computer network system in accordance with an embodiment of the invention.

A method for placing a client, e.g., a VM, in a computer network system in accordance with an embodiment of the invention is described with reference to a flow diagram of FIG. 5. At block 502, a plurality of resource utilization metrics for each candidate device from a group of candidate devices in the computer network system that can support the client is collected. At block 504, continuously variable weights are assigned to the resource utilization metrics for each candidate device. At block 506, a selection score is computed using the resource utilization metrics with the continuously variable weights for each candidate device. At block 508, a target candidate device from the group of candidate devices is selected for placement of the client based on the selection score of the target candidate device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for placing a client in a computer network system, the method comprising:
    collecting a plurality of resource utilization metrics for each candidate device from a group of candidate devices in the computer network system that can support the client;
    assigning continuously variable weights to the resource utilization metrics for each candidate device, wherein each of the resource utilization metrics is assigned at least one of the continuously variable weights and wherein each of the continuously variable weights is a function of a corresponding resource utilization metric;
    computing a selection score using the resource utilization metrics with the continuously variable weights for each candidate device, wherein the selection score is computed by multiplying one of the resource utilization metrics with one of the continuously variable weights assigned to that resource utilization metric; and
    selecting a target candidate device from the group of candidate devices for placement of the client based on the selection score of the target candidate device for resource utilization balancing in the computer network system, wherein the collecting the resource utilization metrics, the assigning the continuously variable weights, the computing the selection score and the selecting the target candidate device are performed using one or more processors.

2. The method of claim 1, wherein the assigning the continuously variable weights includes assigning the continuously variable weights using at least one non-linear convex function.

3. The method of claim 2, wherein the assigning the continuously variable weights includes assigning the continuously variable weights using at least the following function:

$$\alpha \times \left(\frac{1}{1-x}\right)^{\beta},$$

where $\alpha$ and $\beta$ are values greater than zero and x is the utilization of a particular resource.

4. The method of claim 1, wherein the assigning the continuously variable weights includes assigning the continuously variable weights using at least two different functions for two different continuously variable weights.

5. The method of claim 1, further comprising normalizing the resource utilization metrics prior to the assigning of the continuously variable weights to the resource utilization metrics.

6. The method of claim 1, wherein the candidate devices include datastores, host computers or clusters of host computers.

7. The method of claim 6, wherein the client to be placed is a virtual machine.

8. The method of claim 1, further comprising finding suitable candidate devices that can support the client using static properties of the candidate devices that define capabilities of the candidate devices.

9. The method of claim 1, wherein the computing the selection score includes summing products of the resource utilization metrics and the continuously variable weights to derive the selecting score.

10. The method of claim 9, wherein the selecting the target candidate device includes selecting the lowest selection score from all the selection scores of the candidate devices to select the target candidate device.

11. A system comprising:
a plurality of host computers; and
a client placement module operably connected to the plurality of host computers, the client placement module being configured to collect a plurality of resource utilization metrics for each host computer from a group of the host computers that can support a client to be placed in the system, the client placement module comprising:
a dynamic weight adjusting unit configured to assign continuously variable weights to the resource utilization metrics for each host computer from the group of host computers, wherein each of the resource utilization metrics is assigned at least one of the continuously variable weights and wherein each of the continuously variable weights is a function of a corresponding resource utilization metric; and
a selection score computing unit configured to compute a selection score using the resource utilization metrics with the continuously variable weights for each host computer from the group of host computers, wherein the selection score is computed by multiplying one of the resource utilization metrics with one of the continuously variable weights assigned to that resource utilization metric,
wherein the client placement module is configured to select a target host computer from the group of host computers for placement of the client based on the selection score of the target host computer for resource utilization balancing in the system.

12. The system of claim 11, wherein the dynamic weight adjusting unit is configured to assign the continuously variable weights using at least one non-linear convex function.

13. The system of claim 12, wherein the dynamic weight adjusting unit is configured to assign the continuously variable weights using at least the following function:

$$\alpha \times \left(\frac{1}{1-x}\right)^{\beta},$$

where $\alpha$ and $\beta$ are values greater than zero and x is the utilization of a particular resource.

14. The system of claim 11, wherein the dynamic weight adjusting unit is configured to assign the continuously variable weights using at least two different functions for at least two different continuously variable weights.

15. The system of claim 11, wherein the client placement module further includes a normalization unit configured to normalize the resource utilization metrics prior to assignment of the continuously variable weights to the resource utilization metrics.

16. The system of claim 11, wherein the candidate devices include datastores, host computers or clusters of host computers.

17. The system of claim 16, wherein the client to be placed is a virtual machine.

18. The system of claim 11, wherein the client placement module further includes a suitability filter that is configured to find suitable candidate devices that can support the client using static properties of the candidate devices that define capabilities of the candidate devices.

19. The system of claim 11, wherein the selection score computing unit is configured to sum products of the resource utilization metrics and the continuously variable weights to derive the selecting score.

20. The system of claim 19, wherein the client placement module is configured to select the lowest selection score from all the selection scores of the candidate devices to select the target candidate device.

21. A non-transitory computer-readable storage medium containing program instructions for placing a client in a computer network system, wherein execution of the program instructions by one or more processors of a computer system causes the one or more processors to perform steps comprising:
collecting a plurality of resource utilization metrics for each candidate device from a group of candidate devices in the computer network system that can support the client;
assigning continuously variable weights to the resource utilization metrics for each candidate device, wherein each of the resource utilization metrics is assigned at least one of the continuously variable weights and wherein each of the continuously variable weights is a function of a corresponding resource utilization metric;
computing a selection score using the resource utilization metrics with the continuously variable weights for each candidate device, wherein the selection score is computed by multiplying one of the resource utilization metrics with one of the continuously variable weights assigned to that resource utilization metric; and
selecting a target candidate device from the group of candidate devices for placement of the client based on the selection score of the target candidate device for resource utilization balancing in the computer network system.

22. The non-transitory computer-readable storage medium of claim 21, wherein the assigning the continuously variable weights includes assigning the continuously variable weights using at least one non-linear convex function.

23. The non-transitory computer-readable storage medium of claim 22, wherein the assigning the continuously variable weights includes assigning the continuously variable weights using at least the following function:

$$\alpha \times \left(\frac{1}{1-x}\right)^{\beta},$$

where α and β are values greater than zero and x is the utilization of a particular resource.

24. The non-transitory computer-readable storage medium of claim 21, wherein the assigning the continuously variable weights includes assigning the continuously variable weights using at least two different functions for at least two different continuously variable weights.

25. The non-transitory computer-readable storage medium of claim 21, wherein the method further comprises the step of normalizing the resource utilization metrics prior to the assigning of the continuously variable weights to the resource utilization metrics.

26. The non-transitory computer-readable storage medium of claim 21, wherein the candidate devices include datastores, host computers or clusters of host computers.

27. The non-transitory computer-readable storage medium of claim 26, wherein the client to be placed is a virtual machine.

28. The non-transitory computer-readable storage medium of claim 21, wherein the method further comprises the step of finding suitable candidate devices that can support the client using static properties of the candidate devices that define capabilities of the candidate devices.

29. The non-transitory computer-readable storage medium of claim 21, wherein computing the selection score includes summing products of the resource utilization metrics and the continuously variable weights to derive the selecting score.

30. The non-transitory computer-readable storage medium of claim 29, wherein selecting the target candidate device includes selecting the lowest selection score from all the selection scores of the candidate devices to select the target candidate device.

\* \* \* \* \*